Patented Aug. 14, 1928.

1,680,865

UNITED STATES PATENT OFFICE.

MASAO FUJII, OF SENDAGAYA-MACHI, TOYOTAMAGORI, JAPAN.

METHOD OF NEUTRALIZING ACIDITY OR ALKALINITY OF DECOMPOSED PRODUCT OR PRODUCTS BY GLUTAMIC ACID OR ITS SALTS.

No Drawing. Application filed August 3, 1926, Serial No. 126,925, and in Japan August 7, 1925.

This invention relates to a process of neutralizing the acidity or alkalinity of substances derived from proteins, carbohydrates or other suitable organic materials and it comprises a process in which the substances are treated with glutamic acid or salts thereof capable of neutralizing the free acidity or alkalinity of the substances. The object of the invention is to neutralize the acidity or alkalinity of substances derived from proteins and the like directly with glutamic acid or its salts instead of neutralizing the same with the usual inorganic acids or alkalies. As a result, there is obtained a product containing glutamic acid or its salts which is useful as a seasoning material, a foodstuff, and the like.

Various processes have been devised for the treatment or decomposition of proteins, carbohydrates or other organic material in order to obtain useful products therefrom. For instance, it is customary practice to break down starch and cellulose into sugars or to treat sugars, with mineral acids such as hydrochloric or sulphuric acid and in some cases fatty acids. Alkalies such as sodium hydroxide, potassium hydroxide or alkali carbonates have been used to decompose or otherwise treat proteins, carbohydrates and the like. As a result of such treatment, the resulting substances invariably contain quantities of free acid or alkali depending upon the particular reagent used. Therefore it has been necessary to neutralize this free acidity or alkalinity with a suitable neutralizing agent and for this purpose, inorganic acids or bases are customarily used.

In my invention, I depart from the usual practice of neutralizing by means of inorganic acids or bases and instead I neutralize with glutamic acid or a suitable salt thereof. Salts of glutamic acid, particularly the mono-basic sodium salt, are delicious and nutritious substances and are customarily used as an addition substances, by mixing with various foods, drinks, or seasoning materials. Thus in my invention, I not only neutralize free acidity or alkalinity in substances prepared from proteins or carbohydrates, but I also, by means of my neutralizing agent, enhance the value of these substances, giving them the advantageous properties possessed by like substances which have been neutralized and to which has been added mono-basic sodium glutamate for instance. In other words my process differs from those hitherto proposed in that the final material is prepared by simply treating the substances derived from proteins or carbohydrates directly with glutamic acid or salts thereof whereas in processes hitherto proposed, it was necessary to neutralize the substances with an inorganic acid or base prior to addition of the glutamic acid compound.

The final product obtained is useful as a seasoning material, foodstuff and the like and may be prepared in an easy and direct way.

Thus according to this invention, any suitable materials, usually proteins or carbohydrates, are decomposed or treated with alkalies, the product, containing some free alkali, is treated either with glutamic acid, glutamic hydrochloride, or calcium salts of glutamic acid such as mono-basic or di-basic calcium glutamate. If glutamic acid or glutamic acid hydrochloride is used, the free alkali in the material is neutralized to form sodium glutamate or, in the case of the hydrochloride, sodium chloride and free glutamic acid. When calcium glutamate is used, the calcium reacts with the alkali to form sodium glutamate and calcium carbonate for instance if the alkali used is sodium carbonate. The reactions in this case are as follows:

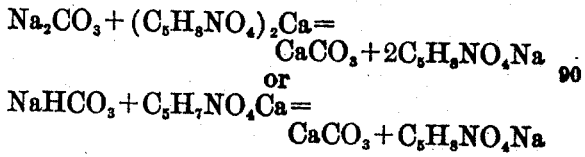

In this way, the free alkali is eliminated and the resulting product contains sodium glutamate.

When the proteins or carbohydrates and the like are treated with acids, the product, containing amounts of free acid, is treated with a metal salt of glutamic acid such as a mono- or di-basic salt whereby the free acid is neutralized. Any glutamic acid remaining as a result of the neutralization is not to be considered as "free" acid within the scope and terms of this invention.

By suitably choosing materials used to treat or decompose the proteins or carbohydrates and by suitably selecting the glutamic acid compound used for neutralization, it is possible to prepare a neutral final product containing varying quantities of glutamic acid or salts thereof, the final product having desirable properties as regards nutrition, seasoning and the like.

Broadly speaking, my invention is useful for the purpose of neutralizing substances obtained from the treatment of proteins such as those derived from meat, fish, birds, etc. or from soy-bean, wheat, maize, casein, albumen and the like and carbohydrates such as starch, cellulose, sugar or gums, stalks, stems, leaves, roots or bulbs of land and sea plants. In the decomposition or treatment of such substances with acids or alkalies it is best to carry the decomposition not beyond the peptonized stage. It is disadvantageous to break down the proteins too far. However, the decomposition, in the case of proteins for instance may proceed to the formation of lower amino acids although in such a case further steps must be employed to decolorize, filter and otherwise purify the material. If decomposition is not carried beyond the peptonization stage, there is the advantage that the quantity of free acid or alkali is small and the final product (after neutralization) does not contain much color. It may be used without further treatment.

When carbohydrates are treated, the decomposition is best stopped when starch, sugar or glucose is formed.

The extent of decomposition or treatment of the initial raw materials is a matter of choice however depending upon the use to which the decomposition products are to be put. My invention is primarily directed to the neutralization of such products.

The metal salts of glutamic acid which I use are usually alkali metal or alkaline earth metal salts: "Beilstein's Hanbook der Organischen Chemie" 4th Edition (1922) Vol. IV pages 488–491 describes salts of glutamic acid which are efficacious.

The product obtained by neutralization with glutamic acid or its salts is very nutritious. It may be used as a seasoning material, in cakes, marmalades, aerated drinks, sauces, vinegar, wine, beer and the like to enhance the taste thereof.

As specific examples of the way I use my invention the following may be given.

*Example I.*

A mixture of 100 parts of starch, 200 parts of water, and 1.5 parts of fuming hydrochloric acid is charged in an autoclave and the starch is decomposed by heating the mixture under a pressure of two atmospheres until the starch does not show any further iodine reaction. To this product di-basic sodium salt of glutamic acid is added, in which the quantity of the latter is so chosen that it is sufficient to neutralize free hydrochloric acid contained in the product as well as to produce the mono-sodium salt of glutamic acid. The chemical equation is as follows:

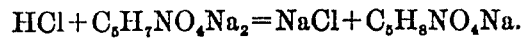

The solution thus produced is either concentrated or dried so that the final product can be obtained in a powdered, crystalline or any other suitable form.

*Example II.*

1 part of a suitable protein, say, fish meat, is decomposed by heating it with the addition of 3 to 5 parts of 0.2 to 2% NaOH solution, to such an extent that the protein is peptonized and the resulted product is treated with either glutamic acid, or glutamic acid hydrochloride, the quantity of which being so chosen that it is sufficient to neutralize free NaOH contained in the product as well as to produce the mono-basic sodium salt of glutamic acid. The chemical equations are as follows:

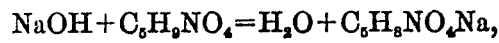

or

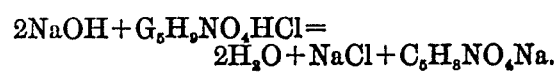

The solution thus obtained is treated in a manner similar to the first example.

*Example III.*

When impure protein, say, animal meat, is treated with the addition of dilute alkaline solution, say, 0.2% NaOH solution, the protein may be dissolved therein. In this case, the mother liquor obtained by filtering the same is not further decomposed but is subjected to neutralization and further treatment in the same manner as in the second example.

In carrying the invention into practice, it is advantageous to prepare the glutamic acid or its salts from protein sources such as wheat, maize, soy-bean, casein and the like by charging the material into an autoclave together with 0.5% of a catalyst, such as iron powder, iron oxide, or powdered tin, and 20 to 30% of 1-10 normal HCl or $H_2SO_4$, the mixture being heated gradually under a pressure not exceeding 4 atmospheres until the hydrolysis is complete. The solution resulting is then worked up to obtain glutamic acid or salts thereof.

What I claim is:

1. In the process of neutralizing products derived from the treatment of proteins and carbohydrates with alkalies or acids which products contain free alkali or acid, the step which comprises treating the product with a glutamic acid compound having the property of reacting with the acid or alkali to neutralize the same.

2. In the process of neutralizing products derived from the treatment of proteins and carbohydrates with alkalies or acids, which products contain free acid or alkali, the step which comprises treating the products with an appropriate glutamic acid salt to neutralize acid or alkali in the product.

3. The process of preparing products derived from proteins and carbohydrates and containing glutamic acid salts which comprises treating said products containing free acid or alkali with an appropriate glutamic acid salt to neutralize the acid or alkali.

4. In the process of neutralizing products derived from the treatment of proteins and carbohydrates with alkalies, which products contain free alkali, the step which comprises treating the products with an appropriate glutamic acid compound to neutralize the alkali and to form alkali metal salts of glutamic acid.

In testimony whereof I affix my signature.

MASAO FUJII.